A. KIMBLE.
ADJUSTABLE FAN FOR DYNAMO ELECTRIC MACHINES.
APPLICATION FILED MAY 18, 1918.
1,318,453. Patented Oct. 14, 1919.
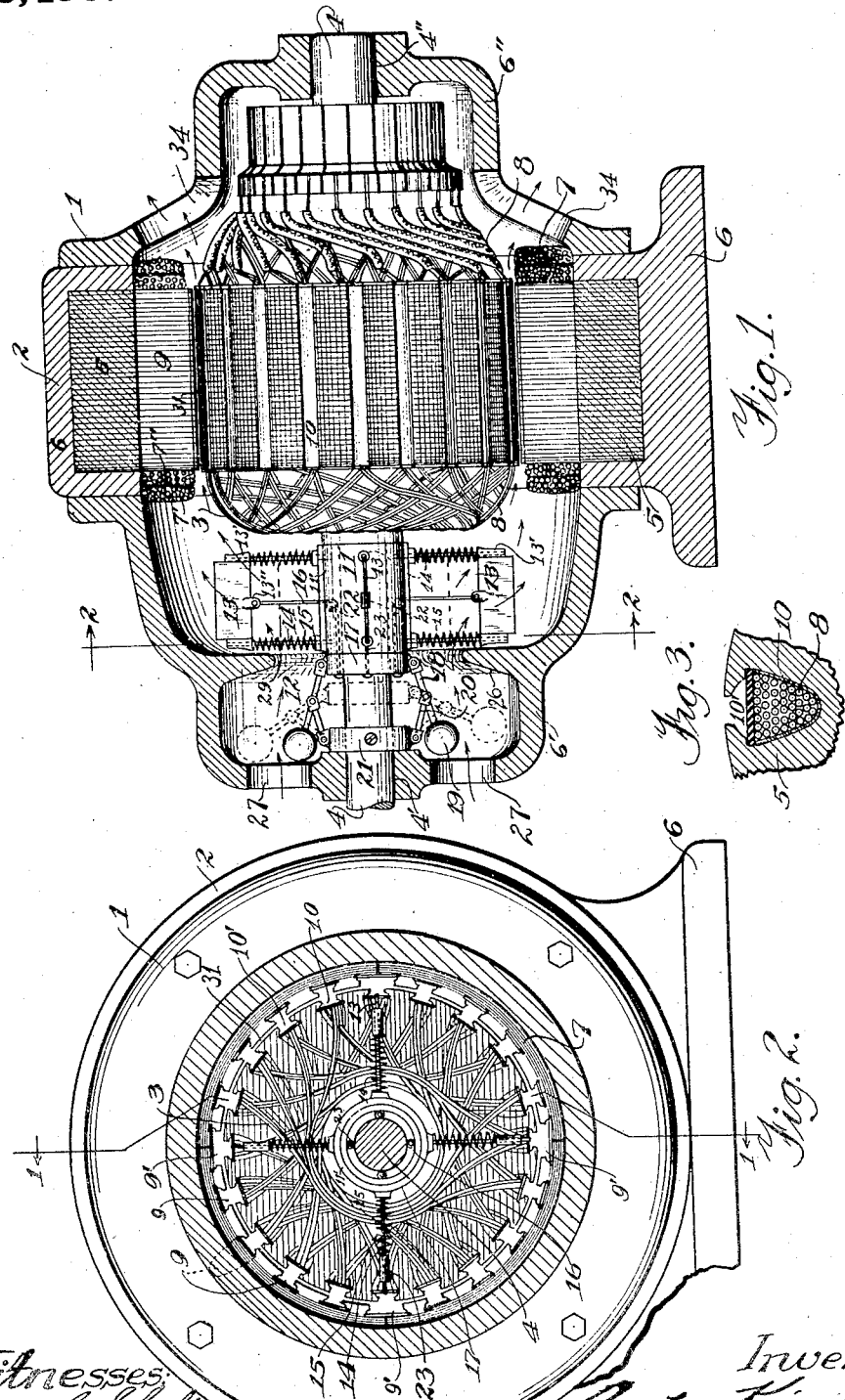

UNITED STATES PATENT OFFICE.

AUSTIN KIMBLE, OF WAUSAU, WISCONSIN, ASSIGNOR TO MARATHON ELECTRIC MANUFACTURING CO., OF WAUSAU, WISCONSIN.

ADJUSTABLE FAN FOR DYNAMO-ELECTRIC MACHINES.

1,318,453.  Specification of Letters Patent.  Patented Oct. 14, 1919.

Application filed May 18, 1918. Serial No. 235,245.

*To all whom it may concern:*

Be it known that I, AUSTIN KIMBLE, a citizen of the United States of America, and a resident of Wausau, county of Marathon, and State of Wisconsin, have invented certain new and useful Improvements in Adjustable Fans for Dynamo-Electric Machines, of which the following is a specification.

This invention relates to draft producing means for ventilating variable speed dynamo-electric machines, particularly series motors, and the main objects of the invention are to provide a fan adapted and arranged to produce a substantially uniform draft effect for various speeds of the machine; to provide adjustable vanes for the fan, and automatic governing means responsive to motor speed adapted and arranged to regulate the position of the vanes according to their angular velocity to give a constant draft effect through a wide range of motor speeds; to provide and positively control radially movable fan vanes, as by centrifugal governing means, in such manner as to maintain the linear peripheral speed of the vanes nearly constant; and to provide a fan having movable blades and means for varying the position of the blades automatically.

An illustrative embodiment of this invention is shown in the accompanying drawings, in which:

Figure 1 is a side view of a motor embodying this invention, the stationary frame and field part of the machine being in vertical axial section on the line 1—1 of Fig. 2, and the rotary part including the armature and ventilating means being in elevation.

Fig. 2 is an end view including a cross section of the frame and shaft on the line 2—2 of Fig. 1, and shows the armature and fan member in elevation.

Fig. 3 represents an enlarged view of a cross section of one of the armature windings in its slot, with a ventilating passage between the edges or lips of the slot.

In the illustrative embodiment shown in the drawings, the dynamo-electric machine 1, in the form of a compound series motor, comprises a stationary frame and field member 2 and a rotor 3 in the form of a commutating armature, the latter being mounted rigidly on a shaft 4 which is journaled on the frame as usual in such machines. The stator member 2 comprises an annular field or yoke 5 of customary laminated construction carried by a suitable support 6, which may be in the form of casting having a suitable base part adapted to support the machine stably when set up ready for use. The field, provided with four poles in this instance, is energized by windings 7 and the armature is provided with windings 8. The field member 5 is provided with an inner peripheral series of slots 9 to receive the field coils, and the armature is slotted as at 10 to receive the armature coils.

The machine as a whole is designed and constructed for variable speed and for this purpose the armature and field are connected in series as usual in motors of this general type.

Moreover, in the embodiment here shown there are also provided shunt coils 7'. The series coils are represented by numeral 7".

In order to produce the necessary magnetic poles on the inner face of the yoke 5 the series windings 7" are suitably distributed in slots for each pole respectively. Extra wide slots 9' are provided to separate the poles, and the shunt windings 7' are disposed in these relatively large slots between the poles. The air gap or clearance between the armature and pole faces is very small.

The frame is provided with inclosure walls or end shields 6' and 6", which are secured detachably to the frame 6. Said shields are apertured for admitting air at one end of the machine, adjacent to the bearing 4', and for discharging the air at the opposite end, spaced somewhat from the other bearing 4".

In order to maintain the necessary cooling draft, there is provided a rotary fan device 11 mounted coturnably on the shaft 4 at the opposite end of the armature from the commutator, and an automatic governor 12 is provided for regulating the fan for substantially constant draft effect. The fan in the form here shown operates centrifugally and includes a plurality of blades or vanes 13 each disposed in a radial position and all being arranged in mutual symmetry about the motor axis. The said vanes are movably supported on radial rods or arms 14 of guide-like character fixed on the hub 11' and adapted to accommodate to and fro outward and inward movement of the vanes. Yielding compression means 15 are disposed between the central hub of the fan and the vanes whereby the latter are urged outward. The guides 14 are in the form of rods which are spaced apart in pairs, one rod for each end of each vane which is correspondingly apertured to receive same, radially perforated end lugs or ears 13' being provided thereon. The spring 15 surround the rods 14 spirally between the hub and the ends 13'. Inwardly acting tension means 16 are provided for overcoming the combined action of said springs and the centrifugal force acting on said vanes, said means being in the form of cords or equivalent means, the outer ends of which are connected to the vanes, as at the middle lugs 13'', and the inner and more adjacent ends being connected to a sleeve 17 mounted slidably on shaft 4 for endwise control by said governor.

The governor mechanism includes a pair of arms 18, the inner ends of which are turnably connected to said sleeve 17 at diametrically opposite points, and the outer ends being provided with weights or balls 19 adapted for actuation outward by centrifugal force. Said arms 18 are connected by links 20 to a second sleeve 21, which is fixed to said shaft 4. One end of each link 20 is pivoted to said sleeve 21 and the opposite end is pivoted to the middle part of the corresponding arm 18.

The cords 16 are diposed each partly in a radial position and partly in a horizontal position parallel with the shaft. A pulley 22 being provided in or upon the fan hub and the latter being provided with apertures or channels 23 to receive the several cords.

The operation of the device is as follows: When the machine is at rest the springs 14 pressing outward against the vanes 13 hold them in their outermost position, the governor weights 19 being thereby retracted to their innermost position. As soon as the motor acquires substantial speed, the governor balls are thrown outward somewhat by centrifugal force, thereby drawing sleeve 17 outward along shaft 4 and accordingly pulling the vanes 13 inward. The degree of inward movement of the vanes is nearly proportional to the angular velocity of the motor.

When the machine is operated at or near full load the heating effect is practically constant for all speeds, and hence the draft effect should remain constant. In order to accomplish this purpose, it is necessary that as the machine slows down the vanes 13 shall take a position of greater air propelling influence, that is to say in this instance they must move outward from their retracted central position to which they are drawn when the machine runs at full speed. This outward movement of the vanes is effected by the springs 15 overcoming the lessened centrifugal force of the governor as the angular speed diminishes. When the machine speeds up the reverse operation occurs.

In order to properly direct the course of the centrifugally driven air the casing is provided on shield 6' with an inward flange 26 of annulus shape adjacent to the outer side of the fan member, so that as the air is drawn inward through the apertures 27 at the governor end it will pass through the opening 29 between the shaft and said flange, and thence outward past the vanes 13, thence through the air gap 31 and unoccupied slot mouth apertures or passageways 10' between the armature and field member to the opposite end of the machine, where the air escapes through the apertures 34, the last mentioned apertures being more remote from the axis than the inlet apertures 27 and 29, and so favoring centrifugal discharge of the heated air.

This invention is applicable to both direct and alternating current motors, and is not limited to a slotted construction of the stator and rotor members, or to any particular form of windings.

Although but one specific embodiment of this invention has been herein shown and described, it will be understood that numerous details of the construction shown may be altered or omitted without departing from the spirit of this invention as defined by the following claims.

I claim:

1. In a variable speed dynamo-electric machine, a draft producing member having vanes movable to more or less effective draft inducing position, and speed controlled governing means for regulating said vanes in accordance with the speed of the rotor, said governing means including resilient means urging said vanes toward their more effective position, and centrifugally operable weights arranged to effectively oppose said resilient means proportionately with the speed.

2. In a variable speed air cooled electric motor having a passageway for conducting a draft of air lengthwise of the motor past the heat generating parts, in combination with a fan and a centrifugal governor therefor, said fan being disposed in said passageway and mounted coturnably with the rotor, the air propelling parts of said fan being movable outward in response to said governor for maintaining their linear velocity substantially constant as the motor speed diminishes.

3. In a variable speed air cooled electric motor having a passageway for conducting a draft of air lengthwise of the motor past the heat generating parts, in combination with a fan and a centrifugal governor therefor, said fan being disposed in said passageway and mounted coturnably with the rotor, said fan being responsive to said governor for maintaining the draft substantially constant for variable speeds of the motor.

4. In a variable speed air cooled motor a draft passage, a ventilating fan of adjustable character in said passage, and means for varying the adjustment of said fan in response to rotor speed, said fan having a hub and a plurality of vanes movable relative to said hub subject to said means for maintaining their air impelling effect substantially constant.

5. In a device of the character described, a rotor having a fan and a governor secured to its shaft, a sleeve slidably mounted on said shaft in operative relation to said governor and fan and responsive to the former, said fan having radially movable vanes and means operatively connecting said sleeve and vanes for controlling the latter.

6. In a device of the character described, a rotor having a fan and a governor secured to its shaft, a sleeve slidably mounted on said shaft in operative relation to said governor and fan and responsive to the former, said fan comprising a hub, guide arms disposed radially in pairs on opposite ends of the hub and vanes disposed in nearly the same plane with each pair of arms respectively and supported thereon for movement inward and outward, and means operatively connecting said vanes and said sleeve.

7. In a device of the character described, a speed controlled governor and a fan mounted on the rotor shaft, said fan including a hub fixed to the shaft, radial guide arms on said hub, radially movable vanes carried by said arms, resilient means urging said vanes outward, and means urging said vanes inward, said last mentioned means being operatively connected to said governor.

8. In a device of the character described, a speed controlled governor and a fan mounted on the rotor shaft, said fan including a hub fixed to the shaft, radial guide arms on said hub, radially movable vanes carried by said arms, resilient means urging said vanes outward, pulleys mounted on said hub, and flexible tension members plying on said pulleys and connecting said vanes and said governor.

Signed at Chicago this 15th day of May, 1918.

AUSTIN KIMBLE.